United States Patent [19]

Okabayashi et al.

[11] Patent Number: 4,931,955

[45] Date of Patent: Jun. 5, 1990

[54] INK JET PRINTING APPARATUS WITH PREPRINTING JET PURGING MECHANISM

[75] Inventors: Mitsumasa Okabayashi; Narao Ito, both of Tokyo, Japan

[73] Assignee: Juki Corporation, Chofu, Japan

[21] Appl. No.: 187,389

[22] Filed: Apr. 28, 1988

[30] Foreign Application Priority Data

Apr. 28, 1987 [JP] Japan ................................ 62-105351
Apr. 28, 1987 [JP] Japan ................................ 62-105354

[51] Int. Cl.[5] .......................... G01D 5/46; B41J 2/165

[52] U.S. Cl. ................................. 64/519; 346/140 R; 346/1.1; 346/75; 400/426

[58] Field of Search ........................ 101/335, 423, 366; 400/126; 346/75, 140 R, 1.1; 364/519

[56] References Cited

U.S. PATENT DOCUMENTS 3,961,337 6/1976 Jung et al. ...................... 346/140 R
4,005,543 12/1977 Lundquist et al. ...................... 346/1
4,050,078 9/1977 Isayama et al. ................. 346/140 R
4,112,435 9/1978 Kattner et al. .................. 346/140 R
4,312,009 1/1982 Lange ............................ 346/140 R
4,413,265 11/1983 Kockler et al. ........................ 346/75
4,419,677 12/1983 Kasugayama et al. ......... 346/140 R
4,494,124 1/1985 Piatt et al. ............................ 346/1.1
4,517,577 5/1985 Miranda et al. ................ 346/140 R
4,540,997 9/1985 Biggs et al. ...................... 346/140 R
4,658,274 4/1987 DeYoung ........................ 346/140 R

FOREIGN PATENT DOCUMENTS 55-82660 6/1980 Japan .
61-56109 12/1986 Japan .

*Primary Examiner*—Gary V. Harkcom
*Assistant Examiner*—Raymond J. Bayerl
*Attorney, Agent, or Firm*—Morgan & Finnegan

[57] ABSTRACT

In an ink jet printer, when a start print signal is input, an encoder outputs the position of a gutter, and the ink jet nozzles start jetting, beginning with the nozzles which are facing the gutter. Thereafter, all of nozzles start jetting, and then normal printing starts. Thereby, ink is saved, quality printing is obtained and the operator is freed from the uneasy feelings arising from abrupt purging or jetting actions. The invention may be provided in rotary ink jet printers using meltable solid ink.

5 Claims, 7 Drawing Sheets

INK JET PRINTING APPARATUS WITH PREPRINTING JET PURGING MECHANISM

BACKGROUND OF THE INVENTION

The invention relates to an ink jet printing apparatus. More particularly, the invention pertains to a method and apparatus for enabling an ink jet printer to obtain uniform and clear printing.

Referring to FIG. 8, one current type of a rotary ink jet printer will be explained. In this embodiment, a paper cassette 1 is set vertically, and is pressed from the backside against a pick-up roller 2 by a pressing body (not shown). When the pick-up roller 2 is rotated by a motor (not shown) driven by an electric signal, a sheet of paper 3 is drawn and conveyed between an insert roller (not shown) and a presser roller 4. The paper 3 is further passed through a inlet rail (not shown) and is conveyed between an outer shell 5 and an inner-shell 6. The paper 3 is conveyed upward by tabs 9*a*, 10*a* provided on endless synchronized belts 9, 10 respectively.

The end-less synchronized belts 9, 10 are driven by drive-pulleys 7*a* and 7*b*, 8*a* and 8*b*, respectively. The drive pulleys 7*a*, 7*b*, 8*a*, 8*b* are driven by a paper feed motor 17 via belts or gears. While the paper is conveyed upward, an ink jet print head 11 rotates and jets ink through an orifice 13. The print head 11 is rotated by a motor 12 and provides a plurality of nozzles at its periphery and each nozzle provides an orifice 13. Thus, the printing on the paper 3 is conducted.

When the upper end of the paper 3 reaches a deflector 15 provided at a paper guide post 14, the lower end of the paper 3 is released from the synchronized belts 9, 10, turns out and drops into a paper tray 16.

In such an ink jet printer, when ink 19 (see FIG. 6) is left unjetted more than about eight hours, the ink 19*a* located near the orifice 13 evaporates slowly and can become more viscous. As a result, this can cause non-uniform printing and degrade printing quality. To solve such problems, Japanese patent publication No. 61-56109 has suggested that when one of the nozzles is left in an unjetted condition for more than a predetermined time period, all nozzles are purged of the ink to secure uniform printing. The purging procedure is controlled and conducted automatically by electric signals.

Further, in such ink jet printing apparatuses wherein solid ink is used and melted by heat during printing, it is possible that bubbles are formed in-between the pass-way from the ink container to the orifice since the ink volume changes as the heater turns on and off. Thus, uniform, clearly dotted printing can not always be conducted. In order to solve this problem, bubbles in the pass-way must be removed. To do so, air is supplied to press the ink and the piezo element works to purge the ink against a gutter 11*a* (FIG. 8).

According to the above-described type of ink-jet printer, when one nozzle is left unjetted for more than a predetermined time period, all nozzles jet the ink regardless of the printing requirement. Such an abrupt mechanical action can render a feeling of uneasiness to the operator and waste ink. Besides, when the ink is purged, a droplet of the ink can stick around the orifice, as FIG. 7A shows. In this case, the printing position can become deviated and the printing quality degraded.

It is therefore an object of the invention to eliminate the afore-mentioned disadvantages of ink jet printers.

SUMMARY OF THE INVENTION

These and other objects of the invention are met with an apparatus according to the present invention. In the invention, when a start print signal is input, an encoder outputs the position of a gutter, and the ink jet nozzles start jetting, beginning with the nozzles which are facing the gutter. Thereafter, all of nozzles start jetting, and then normal printing starts. Thereby, ink is saved, quality printing is achieved and the operator is freed from the aforementioned uneasy feeling arising from abrupt purging or jetting actions.

BRIEF DESCRIPTION OF THE DRAWINGS

The invention will be described in greater detail below by way of reference to the following drawings, in which.

DETAILED DESCRIPTION OF THE DRAWINGS

Figure 1:
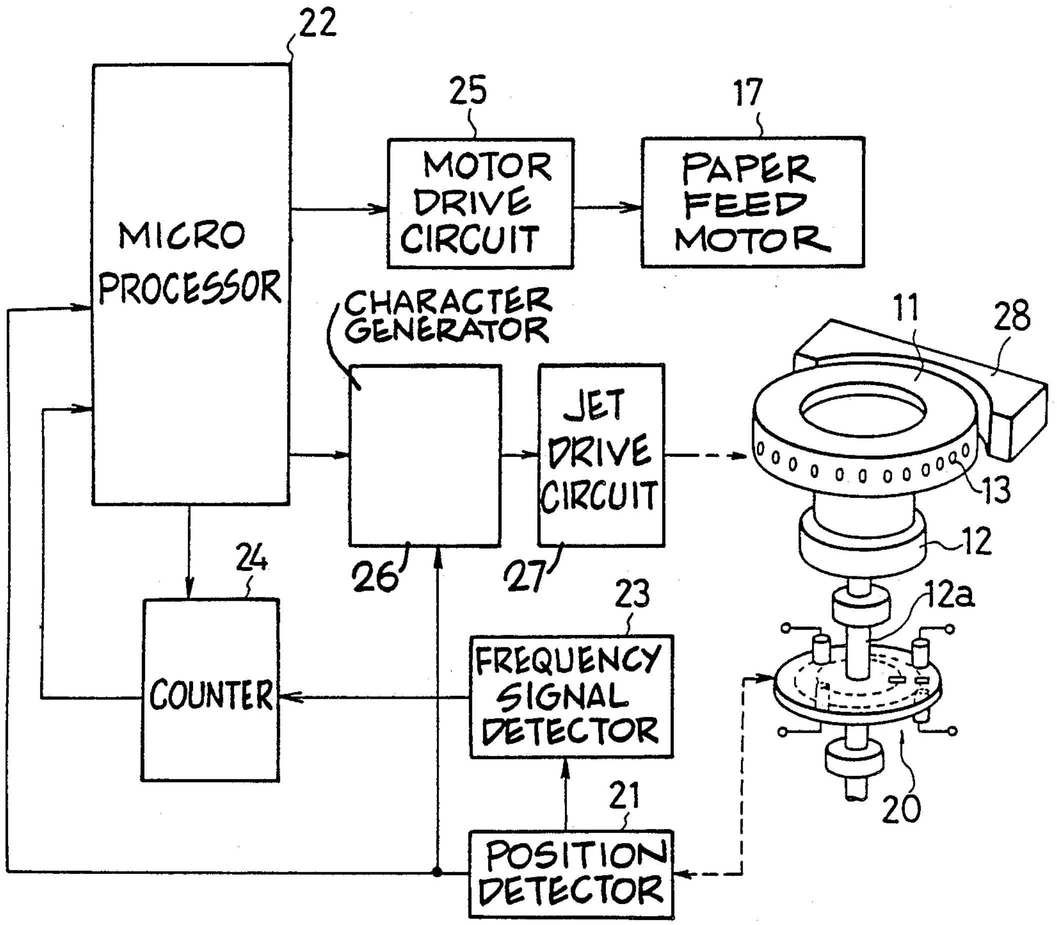
FIG. 1 is an explanatory drawing including a control diagram illustrating control of an ink jet printer according to one embodiment of the present invention.

Referring to FIG. 1, one preferred embodiment of the present invention will be explained. FIG. 1 illustrates an encoder 20 arranged at a rotation shaft 12*a* of a motor 12. Motor 12 rotates a print head 11.

The encoder 20 generates an index signal (one per one rotation) and a position signal (192 per one rotation) is synchronized with the relative position of the print head 11. The index signal from the encoder 20 is detected by a position detector 21 and is input to a microprocessor 22. The encoder shown in this embodiment is a slit-type encoder. However, other types of encoders, such as reflect encoders, are also applicable.

A frequency signal generator 23 counts the output signals from the position detector 21 and outputs a divided pulse signal. The divided pulse signal is counted by a counter 24. The output of counter 24 is input to a terminal of the micro-processor 22.

At the output side of the microprocessor 22, a paper feed motor 17 is connected via a motor drive circuit 25. The piezo element in the print head 11 is also connected to the output side of the microprocessor 22 via a character generator 26 and a jet driver 27. An index signal from the position detector 21 is connected to the character generator 26.

Figures 2A, 2B:
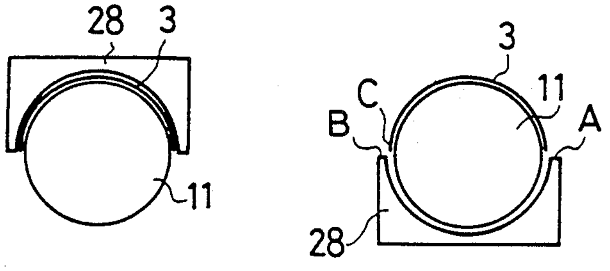
FIGS. 2A and 2B are explanatory drawings showing the relative positions of a print head and paper to the gutter.
Figure 3A:
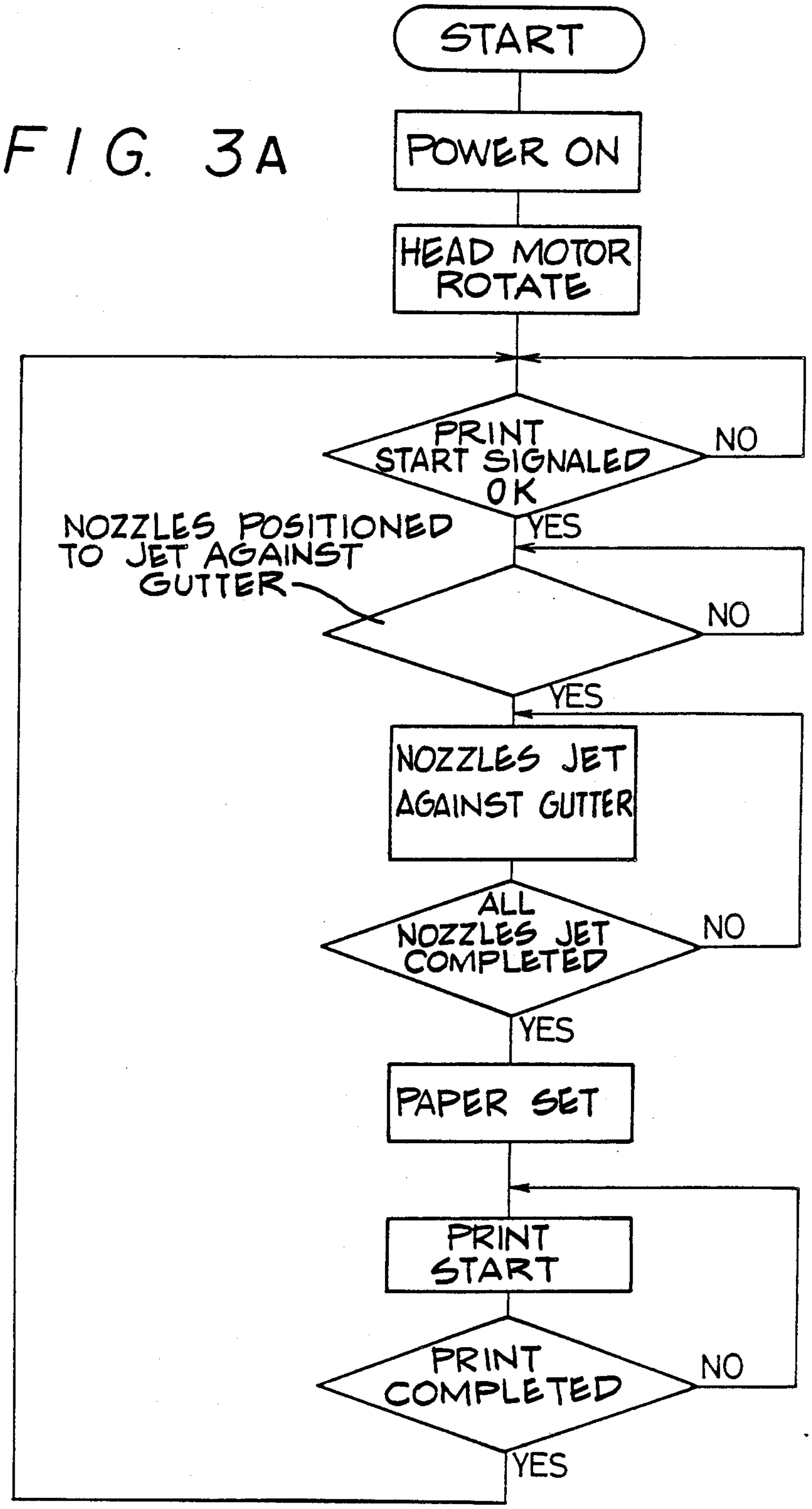
FIGS. 3A and 3B are flow charts according to the present invention.

FIG. 2A illustrates a gutter 28 located at the paper side while FIG. 2B shows the gutter located at the side opposite the paper. The operation of the invention when the location of the gutter is as shown in FIG. 2A, and the paper is located between the print head and the gutter during printing, will first be explained with reference to the flow chart of FIG. 3A.

At first, the power is on. Then the print head motor 12 rotates and the microprocessor 22 outputs a flag for character printing. The microprocessor 22 also commands the paper feed motor 17 to start.

If the position detector 21 detects the signal from the encoder 20, then the nozzles which are faced against the gutter are caused to start jetting. Then, the rest of the nozzles jet against the gutter. Thereafter, the paper feed motor starts and conveys the paper 3 upward along the axial direction of the rotation shaft 12a. Thus, printing on the paper 3 is conducted. If the printing ends, the paper feed motor 17 stops and waits for the next start signal.

Figure 3B:
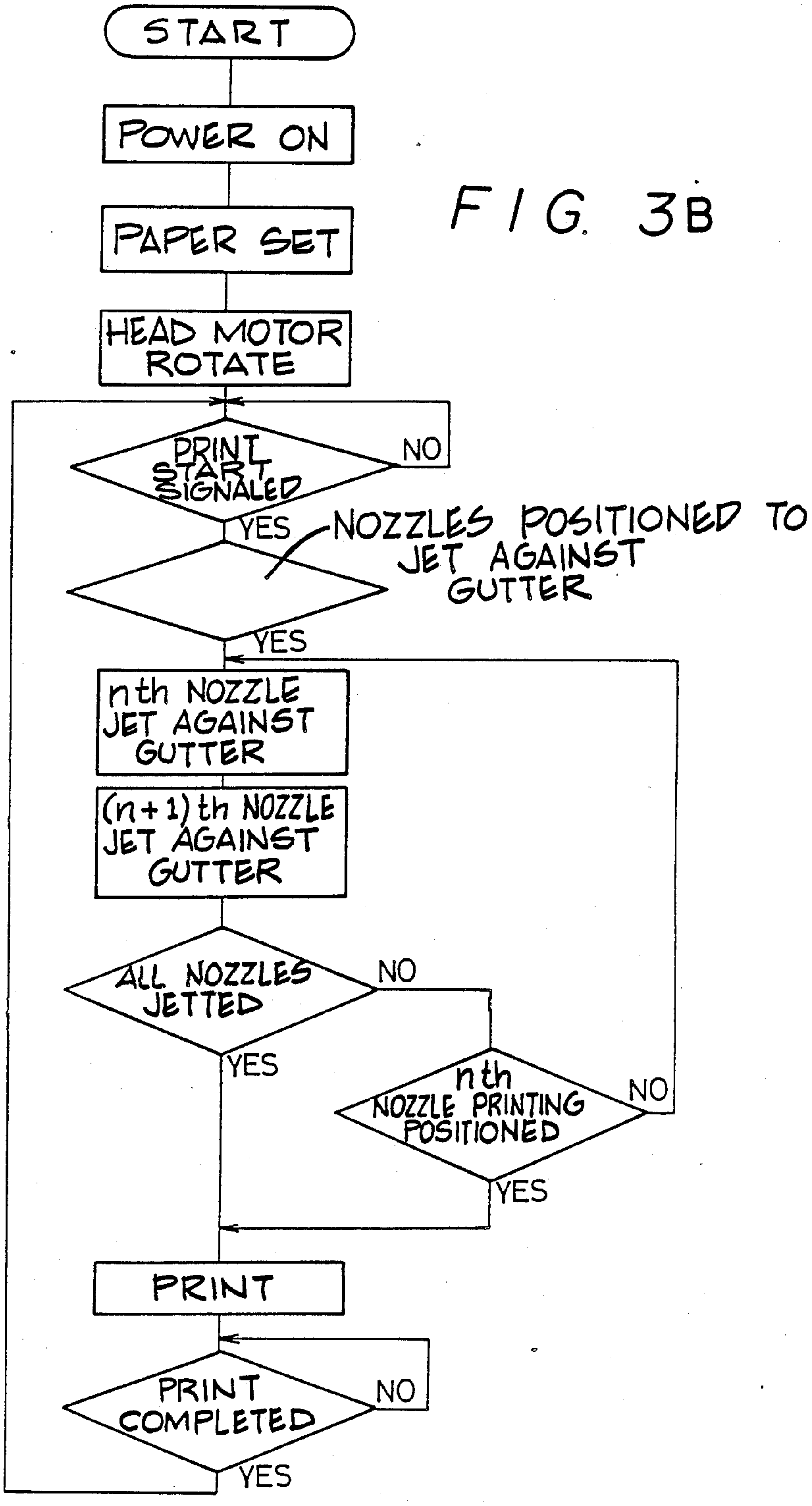

FIG. 3B is a flow chart illustrating the operation of the invention when the location of the gutter is as shown in FIG. 2B, i.e., when the paper is located on the opposite side of the gutter during printing. According to this embodiment, at first, the power is turned on and the print head motor 12 rotates. Paper feed motor 17 conveys the paper 3 upward in axial direction of the rotation shaft 12a and the paper 3 is thus set.

The position detector 21 detects the index signal, so the position of the nozzles relative to the position of the gutter is detected. For example, the first nozzle jets ink against the gutter while travelling from one end A of the gutter to another end B (FIG. 2B). When the nozzle arrives at the paper 3, it starts printing on the paper 3. At this time, the second nozzle is still jetting against the gutter. All nozzles would conduct the same steps successively.

In preferred embodiments, once a nozzle has jetted against the gutter, this nozzle will not jet against the gutter again during this cycle. When the printing ends, the paper feed motor 17 stops and the printer waits for the next signal.

According to the present invention, when a start print signal is input, printing will not start immediately. Rather, the nozzles which are facing against the gutter 28 are first detected by the index signal from the encoder 20. These nozzles are then caused to jet the ink against the gutter, and then to start printing. Thereby, any deteriorated ink near the orifice 13 is jet-purged, and good printing quality is resultantly secured.

Figure 4:
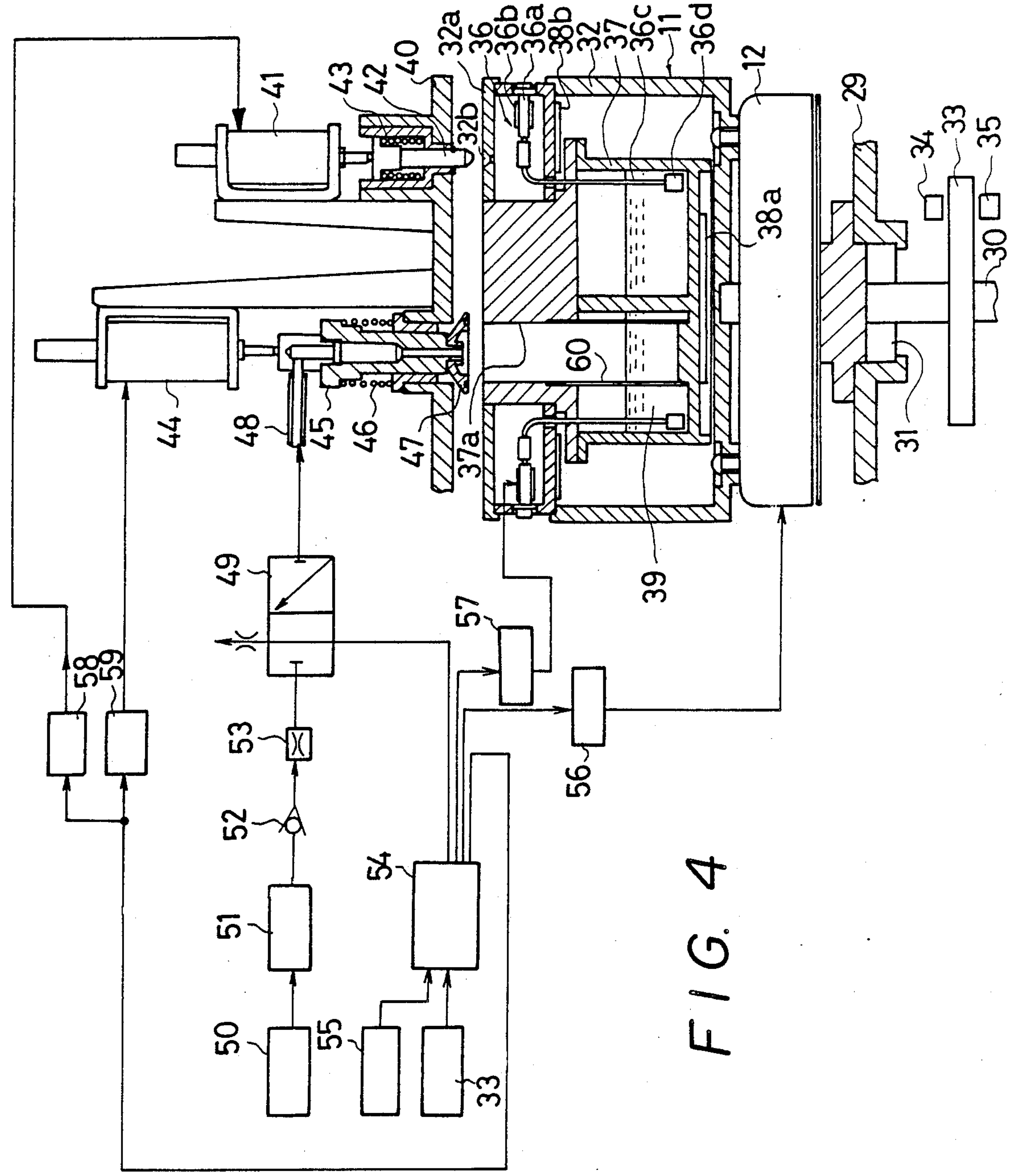
FIG. 4 is an explanatory drawing including a control diagram illustrating control of an ink jet printer according to another embodiment of the present invention.

Referring to FIG. 4, another embodiment of the present invention will be explained. In the embodiment of FIG. 4, the print head motor 12 is placed on a frame 29. A print head body 32 is connected to a shaft 30 of the print head motor 12. An encoder 33 is fixed to the shaft 30 which is rotatably sustained by a bearing 31. A photo-projector 34 and a photo-sensor 35 are closely placed interposing the encoder 33.

Nozzle body 36, with a nozzle 36a and a piezo element 36b, are positioned equally spaced at the circumference of print head 11. The nozzle 36a is connected to an ink container 37 via a tube 36c and a filter 36d. Solid ink (not shown) is supplied into the ink container 37 and is heated by a heater 38a, 38b, so that the solid ink will be liquified to form liquid ink 39.

An interlock solenoid 41 is positioned at upper frame 40 of the print head body 32. An interlock-pin 42 is touched with a plunger of the interlock solenoid 41. A spring 43 is urged to push the interlock pin 42 upwards. The tip end of the interlock pin 42 fits to an interlock hole 32b provided at the upper surface of the print head body 32 when the interlock solenoid is energized.

A purge solenoid 44 is provided at the upper frame 40. A valve-piston 45 is placed under the purge solenoid 44. Spring 46 is urged to push the valve-piston 45 upward against the plunger of the purge solenoid 44. The lower end of the valve-piston 45 provides a cartridge valve 47. The cartridge valve 47 consists of an elastic material like rubber such that the cartridge valve 47 seals the opening 37a of the ink container 37 when the purge solenoid is energized.

The purging solenoid 44, the valve piston 45, the spring 46, the cartridge valve 47, and the tube 48 form a sealing mechanism. The interlocking means includes the interlock solenoid 41, the interlock pin 42 and the spring 43.

According to the embodiment of FIG. 4, when the interlock solenoid is energized, the interlock pin 42 descends and fits into the interlock hole 32b, such that the print head body steps or remains stationary. Then, the purge-valve 44 energizes and pushes down the valve-piston 45. The cartridge-valve 47 fits on the opening 37a, and the air resultantly flows into the ink container 37. Thereby, pressure is applied to ink 39 which is forced to the nozzle 36a via the filter 36d and the tube 36c. Under such a condition, if the piezo element 36b is energized, the ink 39 is strongly jetted through the nozzle 36a.

In this embodiment, the valve piston 45 is further connected to a three-way valve 49 via tube 48. Air from an air pump 50 flows to the three way valve 49 via an air tank 51, a relief valve 52, and a flow-restrictor 53. Air flow at the three-way valve 49 is controlled by a microprocessor 54.

A key-board 55 and an encoder 33 are connected at the input side of a microprocessor 54. At the output side of the microprocessor 54 are connected: a motor drive circuit 56 that drives the print head motor 12; a piezo drive circuit 57 that drives the piezo elements 36b; an interlock solenoid circuit 58 that drives the interlock solenoid 41; and a purge-solenoid circuit 59 that drives the purge solenoid 44.

Figure 5:
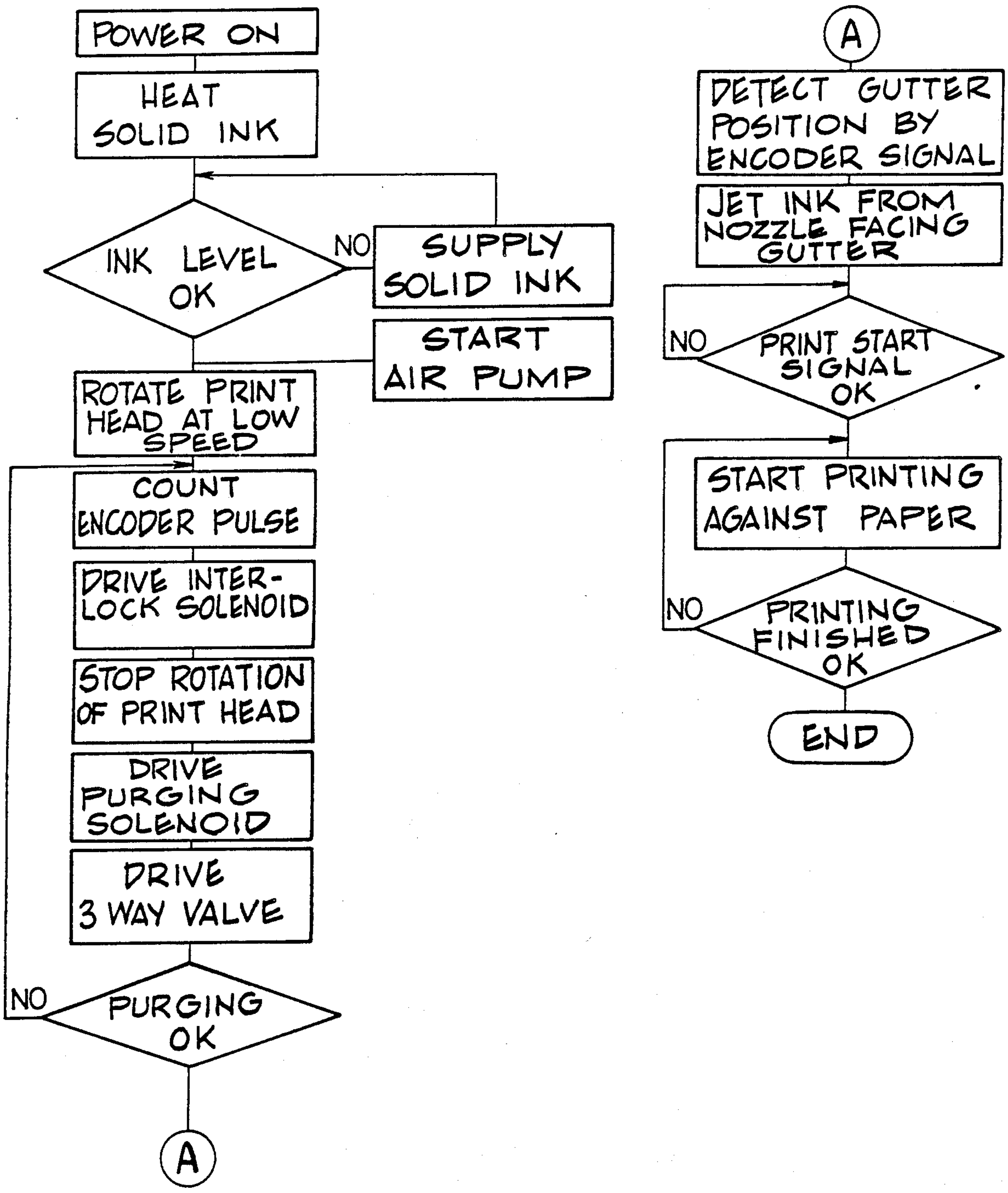
FIG. 5 is a flow chart of the operation of an embodiment according to FIG. 1.
Figure 6:
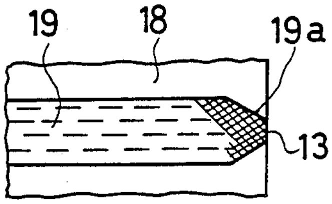
FIG. 6 PRIOR ART
FIG. 6 is an explanatory drawing illustrating the deteriorization of ink in a nozzle.

The operation of the above-described ink jet printing apparatus according to FIG. 4 will be explained hereafter. At first, to evacuate air bubbles in the system, the purging process starts. Referring to FIGS. 4 and 5, the solid ink drops into a filter 60 of the ink container 37. The power is turned on and the solid ink is liquified by the heater 38a, 38b. A lever detector (not shown) in the ink container 37 detects the ink level. If the ink level is low, more solid ink will be dropped into the ink container 37. If the ink level is enough, the air pump 50 works and the print head body 32 is rotated by the print head motor 12 at a low speed. The micro-processor 54 counts the pulses generated when the photo-projector 34 projects light and the photo-sensor 35 receives the light through the slit of the rotating encoder 33.

When the count reaches a predetermined number, the interlock solenoid 41 energizes and the interlock pin 42 is positioned into the interlock hole 32b. The print head body 32 halts and remains in position. Then, the purge solenoid 44 energizes, the valve-piston 45 descends and the cartridge valve 47 fits over the opening 37a. Air from the air pump 50 is supplied, and the ink 39 is purified via filter 60, eliminating alien substances. The ink is further filtered by the filter 36d. Thus, the tube 36c and the nozzle 36a are filled with qualified liquid ink.

Figure 7A:
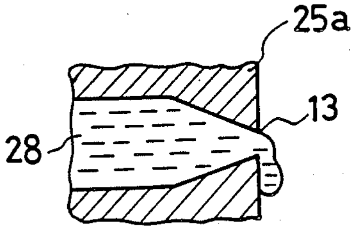
FIG. 7A PRIOR ART
FIG. 7A is a sectional view of a nozzle and droplets being stuck about the orifice.
Figure 7B:
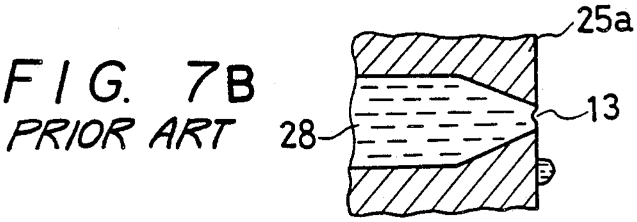
FIG. 7B PRIOR ART
FIG. 7B is a sectional view of a nozzle not having droplets stuck about the orifice.
Figure 8:
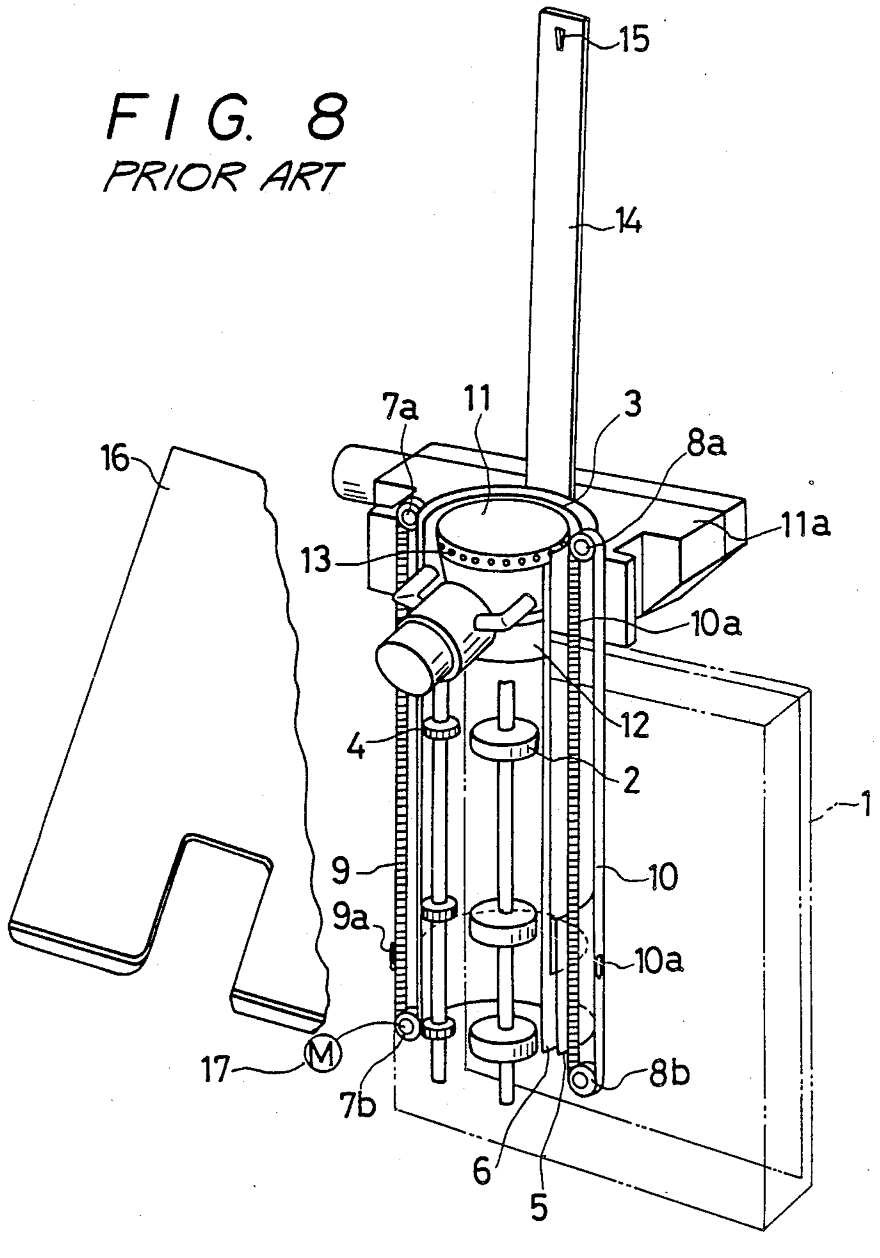
F I G. 8 PRIOR ART
FIG. 8 is a perspective and exploded view of an ink jet printer which may be adapted according to the present invention.

Purging from all nozzles 36*a* is conducted by rotating the print head body 32 intermittently to fit the cartridge valve 47 to the other openings 37*a*. Generally, the print head body 32 is divided into four sections, namely black, red, yellow, and blue color sections. Each section may have an opening 37*a*, and in such a case, the purging process may be repeated four times. Thus, any ink droplets stuck at the orifice 13, as shown in FIG. 7A, would be purged for each color. After purging, all of the orifices would be free from such stuck ink droplets. After purging each nozzle, the paper is set in the apparatus for the start of printing.

According to this embodiment, after purging, the nozzles jet the ink against the gutter 28. The position of the gutter is detected by the encoder 33, and printing on the paper 3 starts after the trial jetting against the gutter. Fine, clear printing is thereby secured.

Thus, according to the invention, when a signal is input to start printing, the encoder detects the position of the gutter. The nozzles facing the gutter jet are caused to jet the ink against the gutter before starting to print on the paper. Thereby, the operator is released from the sense of uneasiness as experienced in the case of Japanese patent publication No. 61-56109 where abrupt purging or jetting may take place. Moreover, after a purging operation, the position of the gutter can be similarly detected by the encoder. In such a case, the nozzle facing the gutter can be made to jet the ink first against the gutter and then on the paper. Thus, good printing is secured.

As many apparently widely different embodiments of the invention may be made without departing the spirit and scope therein, it is to be understood that invention is not limited to the specific embodiments described herein and should be interpreted only in accordance with the claims which follow.

We claim:

1. An ink jet printing apparatus, comprising:

(a) an ink jet means having a jetting element for jetting ink from an orifice, said ink jet means being movable for printing within a movable range;

(b) gutter means positioned within the movable range of the ink jet means partially surrounding the ink jet means;

(c) detecting means for detecting that the ink jet jetting element is facing the gutter means;

(d) first means for detecting a signal to start printing; and (e) driving means for energizing the ink jet means when a detect signal from said detecting means is generated in association with said first means.

2. An ink jet printing apparatus, comprising:

(a) ink jet means for jetting ink from an orifice by piezo-effect, said ink jet means providing a plurality of nozzles and moving through a range for printing;

(b) gutter means positioned within the movable range on the ink jet means;

(c) encoder means for detecting the position of each nozzle in the ink jet means;

(d) a first means for detecting in cooperation with the encoder means the position of each nozzle with respect to the gutter means;

(e) second means for detecting that each nozzle is positioned at a printable position;

(f) third means for detecting a signal to start printing; and (g) control means for driving the piezo-element of a nozzle detected by the second means after driving the piezo-element of a nozzle detected by the first means in association with the third means of detecting the signal of start print.

3. A method for controlling an ink jet printer, comprising the steps of:

(a) moving an ink jet means having a jetting element;

(b) detecting that a jetting element is positioned towards a gutter;

(c) energizing the jetting element in the ink jet means to jet against the gutter when the condition of step (b) has been detected;

(d) detecting a signal to start printing;

(e) detecting that the jetting element is moved to a printable position; and (f) printing on a paper with the ink jet means, wherein the ink jet means conducts rotary motion around a fixed shaft.

4. An ink jet printing apparatus, comprising:

(a) an ink jet means having a jetting element for jetting ink from an orifice, said jetting element being movable for printing within a movable range;

(b) gutter means positioned within the movable range of the ink jet means and partially surrounding the ink jet means;

(c) detecting means for detecting that the jetting element is positioned towards the gutter means;

(d) first means for detecting a signal to start printing; and (e) driving means for energizing the jetting element when a detect signal from said detecting means is generated in association with said first means, (f) wherein said ink jet means is characterized by conducting rotary motion around a fixed shaft.

5. An ink jet printing apparatus, comprising:

(a) an ink jet means having a jetting element for jetting ink from an orifice, said jetting element being movable for printing within a movable range;

(b) gutter means positioned within the movable range of the ink jet means and partially surrounding the ink jet means;

(c) detecting means for detecting that the jetting element is positioned towards the gutter means;

(d) first means for detecting a signal to start printing; and (e) driving means for energizing the jetting element when a detect signal from said detecting means is generated in association with said first means, said apparatus being further characterized by providing a plurality of nozzles at the periphery of the ink jet means.

* * * * *